US006908186B2

(12) United States Patent
Zheng et al.

(10) Patent No.: US 6,908,186 B2
(45) Date of Patent: *Jun. 21, 2005

(54) INKJET INK COMPOSITION AND AN INK/RECEIVER COMBINATION

(75) Inventors: Shiying Zheng, Webster, NY (US); Huijuan D. Chen, Webster, NY (US); Ricky G. Frazier, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/397,706

(22) Filed: Mar. 26, 2003

(65) Prior Publication Data

US 2004/0189763 A1 Sep. 30, 2004

(51) Int. Cl.$^7$ .................................................. B41J 2/01
(52) U.S. Cl. ........................ 347/100; 347/101; 523/160
(58) Field of Search .................... 347/100, 95, 96, 347/105, 101, 98; 106/31.6, 31.13; 523/160

(56) References Cited

U.S. PATENT DOCUMENTS

| | | | |
|---|---|---|---|
| 2,244,325 A | 6/1941 | Bird | |
| 2,574,902 A | 11/1951 | Bechtold et al. | |
| 2,597,872 A | 5/1952 | Iler | |
| 3,706,706 A | 12/1972 | Vandenberg | |
| 4,106,027 A | 8/1978 | Hoffmann et al. | |
| 4,156,616 A | 5/1979 | Dietz et al. | |
| 4,311,775 A | 1/1982 | Regan | |
| 4,597,794 A | 7/1986 | Ohta et al. | |
| 4,698,651 A | 10/1987 | Moore et al. | |
| 4,762,875 A | 8/1988 | Gold | |
| 5,026,427 A | 6/1991 | Mitchell et al. | |
| 5,085,698 A | 2/1992 | Ma et al. | |
| 5,086,698 A | 2/1992 | Wirz | |
| 5,141,556 A | 8/1992 | Matrick | |
| 5,160,370 A | 11/1992 | Suga et al. | |
| 5,169,436 A | 12/1992 | Matrick | |
| 5,172,133 A | 12/1992 | Suga et al. | |
| 5,279,654 A | 1/1994 | Keirs et al. | |
| 5,324,349 A | 6/1994 | Sano et al. | |
| 5,630,868 A | 5/1997 | Belmont et al. | |
| 5,985,514 A | * 11/1999 | Zheng et al. | ............... 101/451 |
| 5,997,622 A | 12/1999 | Weber et al. | |
| 6,001,161 A | 12/1999 | Evans et al. | |
| 6,087,416 A | * 7/2000 | Pearlstine et al. | .......... 523/160 |
| 6,432,523 B1 | * 8/2002 | Ma et al. | ................. 428/304.4 |
| 6,468,338 B1 | 10/2002 | Evans et al. | |
| 6,660,449 B2 | * 12/2003 | Zheng et al. | ............ 430/270.1 |
| 2003/0027892 A1 | 2/2003 | Wang et al. | |
| 2003/0060537 A1 | * 3/2003 | Palazzo | ...................... 523/160 |
| 2003/0113653 A1 | 6/2003 | Zheng et al. | |
| 2003/0119984 A1 | 6/2003 | Wang et al. | |

FOREIGN PATENT DOCUMENTS

| | | | | |
|---|---|---|---|---|
| EP | 0 882 104 B1 | 11/1986 | | |
| EP | 928821 A1 | * 7/1999 | ........... | C09D/11/00 |
| JP | 01262022 A | 10/1989 | | |

OTHER PUBLICATIONS

Bunte, *Chem.Ber.* 7, 646, 1884.
Thames, *Surf. Coating*, 3 (Waterborne Coat.), Chapter 3, pp. 125–153, Wilson et al. (Eds.).
Prog. Phys. Org. Chem. 2, 323, 1964, Carpenter.
B.K., *Determination of Organic Reaction Mechanisms*, John Wiley & Sons, New York, 1984, pp. 144–146.
J. Med. Chem., 16, 1207, 1973.
U.S. Appl. No. 09/822,723, filed Mar. 30, 2001, entitled Ink Jet Composition, by Wang et al.
Co–pending U.S. Appl. No. 10/256,519,Chen et al. *An Aqueous Inkjet Ink And Receiver Combination* (D–84449).
Co–pending U.S. Appl. No. 10/256,822,Chen et al. *Inkjet Printing Method* (D–85097).
Co–pending U.S. Appl. No. 10/256,589,Chen et al. *Inkjet Printing Method For An Ink/Receiver Combination* (D–85100).
Co–pending U.S. Appl. No. 10/256/989, Wang et al. *Inkjet Ink Composition And Ink/Receiver Combination* (D–84448).

* cited by examiner

Primary Examiner—Manish Shah
(74) Attorney, Agent, or Firm—Doreen M. Wells; Sarah Meeks Roberts

(57) ABSTRACT

An aqueous inkjet ink including: a pigment; a water-soluble heat sensitive ionomer; at least one surfactant; and a humectant; wherein the ionomer is a charged polymer having at least 15 mole % of the recurring units negatively or positively charged.

27 Claims, No Drawings

INKJET INK COMPOSITION AND AN INK/RECEIVER COMBINATION

CROSS REFERENCE TO RELATED APPLICATIONS

This application relates to commonly assigned copending application Ser. No. 10/256,519, entitled AN AQUEOUS INKJET INK AND RECEIVER COMBINATION; application Ser. No. 10/256,822, entitled INKJET PRINTING METHOD FOR AN INK/RECEIVER COMBINATION; application Ser. No. 10/256,589, entitled INKJET PRINTING METHOD; application Ser. No. 10/256,989entitled INK JET INK COMPOSITION AND INK/RECEIVER COMBINATION; application Ser. No. 10/083,258, entitled IMAGING MEMBERS CONTAINING CARBON BLACK AND METHODS OF IMAGING AND PRINTING.

FIELD OF THE INVENTION

This invention relates to an aqueous ink jet ink composition comprising pigment and a heat sensitive ionomer and to a combination of the ink and a receiver.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging and large format printing for outdoor applications such as banners, signages, displays, posters, billboard and bus wraps.

This technique of printing is well suited for printing on a variety of surfaces (receivers) including porous and non-porous surfaces. Porous inkjet receivers have the advantage of large fluid intake and this provides fast printing speed. However, in some applications, such as banners, signages, displays, posters, billboard and bus wraps, these porous receivers suffer from durability issues such as lightfastness, waterfastness, abrasion resistance and weather resistance. In order to overcome these problems, the prints are usually post treated by methods such as lamination, which adds to the cost considerably. Historically, in order to overcome these problems, solvent based inks or UV curable inks were developed to be printed on non-absorbing substrates such as vinyl to achieve the desired durability. U.S. Pat. No. 4,106,027describes such a solvent based ink that is suitable for printing images on non-absorbing surfaces with improved adhesion and durability. EP 0 882 104 B1 describes a UV curable inkjet ink composition for better durability of the print on non-absorbing substrate. A significant environmental, health and safety concern with both of these types of ink is the evaporation of solvent or UV monomer during printing.

U.S. Pat. No. 6,087,416 describes the use of an aqueous based pigment ink for printing on non-absorbing vinyl substrate. That ink contains a grafted copolymer binder that is soluble in the aqueous vehicle but insoluble in water. However, the problem with the ink is that, due to the soluble nature of the binder in the ink vehicle, the ink viscosity is high and the printing reliability is poor. In addition, the printed images are not durable to solvent.

U.S. Pat. No. 4,762,875 describes a printing ink containing pigment and polymer additives for plastics and metal surfaces, however, there is a problem with this invention that the solid content for this ink is high, therefore the viscosity of the ink is too high for inkjet ink applications; in addition, the additives used in this invention is hydrophilic in nature therefore the resulted coatings has poor water resistance.

JP 01262022A discloses an ink jet ink composition containing pigment and a thermal curing agent. There is a problem with this invention in that there are excess of the hydrophilic components remaining in the print, an extra step of "washing" has to be done to remove these materials in order to achieve the image durability.

U.S. patent application Ser. No. 10/083,258 discloses the use of a composition containing a heat sensitive polymer in printing plate applications; However, no use in ink jet inks is disclosed.

Therefore, there is a need for an aqueous based ink jet ink that provides good waterfastness, lightfastness, abrasion resistance, good adhesion to non-absorbing substrates including untreated vinyl, and that can be printed reliably through a piezo or thermal printhead.

SUMMARY OF THE INVENTION

This and other objects are achieved in accordance with the present invention which discloses an aqueous inkjet ink comprising:
  a pigment;
  a heat-sensitive ionomer,
  at least one surfactant;
  a humectant;
  wherein the ionomer is a charged polymer having at least 5 mole % of the recurring units negatively or positively charged.

Another embodiment of the invention discloses:

An aqueous inkjet ink and receiver combination wherein the aqueous inkjet ink comprises:
  a pigment;
  a heat sensitive ionomer;
  at least one surfactant;
  a humectant; and
the receiver comprises a non-absorbing substrate.

It was found that the colloid stability, stain resistance and abrasion resistance of an ink jet image was improved using the composition described herein.

DETAILED DESCRIPTION OF THE INVENTION

The ink composition of the present invention is suited for printing on a variety of substrates, especially on non-absorbing substrates. The non-absorbing substrates that may be used in the present invention include any substrate that is essentially non-porous. They are usually not specially treated for additional liquid absorption. Therefore, these materials have very low or no liquid absorbing capacity. Examples of such non-absorbing substrates are metals such as aluminum, copper, stainless steel and alloy etc.; plastics such as vinyl, polycarbonate, polytetrafluoroethylene (PTFE), polyethylene, polypropylene, polystyrene, cellulose; and other substrates such as ceramics, glass.

In order to achieve good image durability when printing aqueous based inks onto a non-absorbing substrate, the polymeric binder in the ink composition needs to be essentially hydrophobic, capable of providing good adhesion strength to the non-absorbing substrate, and also not be easily re-dispersible in water after drying. In addition, good ink storage stability as well as nozzle jettability requires the hydrophobic polymer binder to be both sufficiently stable as a dispersion and be compatible with other ink components, such as surfactant, colorants and humectants. Furthermore, the ink should have sufficiently low surface tension to have good wettability when printing unto a non-absorbing substrate.

The pigment used in the current invention can be either self-dispersible pigment such as those described in U.S. Pat. No. 5,630,868, encapsulated pigments as those described in the pending U.S. patent application Ser. No. 09/822,723, or can be stabilized by a dispersant. The process of preparing inks from pigments commonly involves two steps: (a) a dispersing or milling step to break up the pigment to the primary particle, and (b) dilution step in which the dispersed pigment concentrate is diluted with a carrier and other addenda to a working strength ink. In the milling step, the pigment is usually suspended in a carrier (typically the same carrier as that in the finished ink) along with rigid, inert milling media. Mechanical energy is supplied to this pigment dispersion, and the collisions between the milling media and the pigment cause the pigment to deaggregate into its primary particles. A dispersant or stabilizer, or both, is commonly added to the pigment dispersion to facilitate the deaggregation of the raw pigment, to maintain colloidal particle stability, and to retard particle reagglomeration and settling.

There are many different types of materials which may be used as milling media, such as glasses, ceramics, metals, and plastics. In a preferred embodiment, the grinding media can comprise particles, preferably substantially spherical in shape, e.g., beads, consisting essentially of a polymeric resin. In general, polymeric resins suitable for use as milling media are chemically and physically inert, substantially free of metals, solvent and monomers, and of sufficient hardness and firability to enable them to avoid being chipped or crushed during milling. Suitable polymeric resins include crosslinked polystyrenes, such as polystyrene crosslinked with divinylbenzene, styrene copolymers, polyacrylates such as poly(methyl methylacrylate), polycarbonates, polyacetals, such as Derlin™, vinyl chloride polymers and copolymers, polyurethanes, polyamides, poly (tetrafluoroethylenes), e.g., Teflon™, and other fluoropolymers, high density polyethylenes, polypropylenes, cellulose ethers and esters such as cellulose acetate, poly(hydroxyethylmethacrylate), poly (hydroxyethylacrylate), silicone containing polymers such as polysiloxanes and the like. The polymer can be biodegradable. Exemplary biodegradable polymers include poly (lactides), poly(glycolids) copolymers of lactides and glycolide, polyanhydrides, poly(imino carbonates), poly(N-acylhydroxyproline) esters, poly(N-palmitoyl hydroxyprolino) esters, ethylene-vinyl acetate copolymers, poly(orthoesters), poly(caprolactones), and poly (phosphazenes). The polymeric resin can have a density from 0.9 to 3.0 g/cm3. Higher density resins are preferred inasmuch as it is believed that these provide more efficient particle size reduction. Most preferred are crosslinked or uncrosslinked polymeric media based on styrene.

Milling can take place in any suitable grinding mill. Suitable mills include an air jet mill, a roller mill, a ball mill, an attritor mill and a bead mill. A high speed mill is preferred. By high speed mill we mean milling devices capable of accelerating milling media to velocities greater than about 5 meters per second. Sufficient milling media velocity is achieved, for example, in Cowles-type saw tooth impeller having a diameter of 40 mm when operated at 9,000 rpm. The preferred proportions of the milling media, the pigment, the liquid dispersion medium and dispersant can vary within wide limits and depends, for example, up on the particular material selected and the size and density of the milling media etc. After milling is complete, the dispersion of active material is separated from the grinding media by simple sieving or filtration. With either of the above modes the preferred amounts and ratios of the ingredients of the mill grind will vary widely depending upon the specific materials and the intended applications. The contents of the milling mixture comprise the mill grind and the milling media. The mill grind comprises pigment, dispersant and a liquid carrier such as water. For aqueous ink jet inks, the pigment is usually present in the mill grind at 1 to 50 weight %, excluding the milling media. The weight ratio of pigment to dispersant is 20:1 to 1:2. The high speed mill is a high agitation device, such as those manufactured by Morehouse-Cowles, Hockmeyer et al.

The dispersant is another ingredient in the mill grind. It can be either a small molecule or a polymer. Preferred dispersants used in the present invention include sodium dodecyl sulfate, acrylic and styrene-acrylic copolymers, such as those disclosed in U.S. Pat. Nos. 5,085,698 and 5,172,133, and sulfonated polyesters and styrenics, such as those disclosed in U.S. Pat. No. 4,597,794. Other patents referred to above in connection with pigment availability also disclose a wide variety of dispersants. The dispersant used in the examples is potassium N-methyl-N-oleoyl taurate (K-OMT).

The milling time can vary widely and depends upon the pigment, mechanical means and residence conditions selected, the initial and desired final particle size, etc. For aqueous mill grinds using the preferred pigments, dispersants, and milling media described above, milling times will typically range from 1 to 100 hours. The milled pigment concentrate is preferably separated from the milling media by filtration.

The pigment particles useful in the invention may have any particle sizes which can be jetted through a print head. Preferably, the pigment particles have a mean particle size of less than about 0.5 micron, more preferably less than about 0.2 micron.

A wide variety of organic and inorganic pigments, alone or in combination, may be selected for use in the present invention. Colorant particles which may be used in the invention include pigments as disclosed, for example in U.S. Pat. Nos. 5,026,427; 5,086,698; 5,141,556; 5,160,370; and 5,169,436, the disclosures of which are hereby incorporated by reference. The exact choice of pigments will depend upon the specific application and performance requirements such as color reproduction and image stability. Pigments suitable for use in the present invention include, for example, azo pigments, monoazo pigments, disazo pigments, azo pigment lakes, β-Naphthol pigments, Naphthol AS pigments, benzimidazolone pigments, disazo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrrolo pyrrole pigments, titanium oxide, iron oxide, and carbon black. Typical examples of pigments which may be used include Color Index (C. I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C. I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C. I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Violet 1, 2, 3, 5:1, 13, 19, 23, 25, 27, 29, 31, 32, 37, 39, 42, 44, 50; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66; C.I. Pigment Green 1, 2, 4, 7, 8, 10, 36, 45; C.I. Pigment Black 1, 7, 20, 31, 32, and C.I. Pigment Brown 1, 5, 22, 23, 25, 38, 41, 42. In a preferred embodiment of the invention, the pigment is C.I. Pigment Blue 15:3, C.I. Pigment Red 122, C.I. Pigment Yellow 155, C.I. Pigment Yellow 74, C.I. Pigment Black 7 or bis(phthalocyanylalumino)tetraphenyldisiloxane as described in U.S. Pat. No. 4,311,775, the contents of which are incorporated herein by reference.

In the case of organic pigments, the ink may contain up to approximately 20% pigment by weight, but will generally be in the range of approximately 0.1 to 10%, preferably approximately 0.1 to 5%, by weight of the total ink composition for most ink jet printing applications. If an inorganic pigment is selected, the ink will tend to contain higher weight percentages of pigment than with comparable inks employing organic pigments.

Instead of pigment, a dye can also be used in the current invention. Preferably, the dye is a water insoluble dye. To make the ink, the water insoluble dye can be dispersed or encapsulated into water dispersible particles as disclosed in U.S. Ser. No. 10/020,694, filed Dec. 14, 2001. A broad range of water-insoluble dyes may be used in the invention such as an oil dye, a disperse dye, or a solvent dye, such as Ciba-Geigy Orasol Red G, Ciba-Geigy Orasol Blue GN, Ciba-Geigy Orasol Pink, and Ciba-Geigy Orasol Yellow. Preferred water-insoluble dyes can be xanthene dyes, methine dyes, polymethine dyes, anthroquinone dyes, merocyanine dyes, azamethine dyes, azine dyes, quinophthalone dyes, thiazine dyes, oxazine dyes, phthalocyanine dyes, mono or poly azo dyes, and metal complex dyes. More preferably, the water insoluble dyes can be an azo dye such as a water insoluble analog of the pyrazoleazoindole dye disclosed in U.S. Ser. No. 09/689,184 filed Oct. 12, 2000, incorporated herein by reference, and the arylazoisotbiazole dye disclosed in U.S. Pat. No. 4,698,651, incorporated herein by reference, or a metal-complex dye, such as the water-insoluble analogues of the dyes described in U.S. Pat. Nos. 5,997,622 and 6,001,161, both incorporated herein by reference, i.e., a transition metal complex of an 8-heterocyclylazo-5-hydroxyquinoline. The solubility of the water insoluble dye used in the present invention should be less than 1 g/L in water, and more preferably less than 0.5 g/L in water.

The water insoluble dye can be present in any effective amount in the ink of the present invention, usually up to about 20% by weight of an ink jet ink composition, and preferably from about 0.05 to 15 wt. %. The colorant used in the current invention can also be a dye. In a preferred embodiment of the invention, the dye is a water insoluble dye. To make the ink, the water insoluble dye can be dispersed or encapsulated into water dispersible particles as disclosed in Ser. No. 10/020,694, filed Dec. 14, 2001. A broad range of water-insoluble dyes may be used in the invention such as an oil dye, a disperse dye, or a solvent dye, such as Ciba-Geigy Orasol Red G, Ciba-Geigy Orasol Blue GN, Ciba-Geigy Orasol Pink, and Ciba-Geigy Orasol Yellow. Preferred water-insoluble dyes can be xanthene dyes, methine dyes, polymethine dyes, anthroquinone dyes, merocyanine dyes, azamethine dyes, azine dyes, quinophthalone dyes, thiazine dyes, oxazine dyes, phthalocyanine dyes, mono or poly azo dyes, and metal complex dyes. More preferably, the water insoluble dyes can be an azo dye such as a water insoluble analog of the pyrazoleazoindole dye disclosed U.S. Pat. No. 6,468,338, incorporated herein by reference, and the arylazoisothiazole dye disclosed in U.S. Pat. No. 4,698,651, incorporated herein by reference, or a metal-complex dye, such as the water-insoluble analogues of the dyes described in U.S. Pat. Nos. 5,997,622 and 6,001,161, both incorporated herein by reference, i.e., a transition metal complex of an 8-heterocyclylazo-5-hydroxyquinoline. The solubility of the water insoluble dye used in the present invention should be less than 1 g/L in water, and more preferably less than 0.5 g/L in water.

The water insoluble dye can be present in any effective amount in the ink of the present invention, usually up to about 20% by weight of an ink jet ink composition, and preferably from about 0.05 to 15 wt. %.

The heat sensitive ionomers used in the current invention are generally comprised of recurring units, of which at least 5 mol % include ionic groups of the same charge. Preferably, at least 15 mol % of the recurring groups include ionic groups of the same ionic charge. Thus each of these polymers has a net positive or negative charge provided by these ionic groups.

Representative ionomers useful in the practice of this invention can be selected from one or more of four broad classes of materials:

I) crosslinked or uncrosslinked vinyl polymers comprising recurring units comprising positively-charged, pendant N-alkylated aromatic heterocyclic groups, II) crosslinked or uncrosslinked polymers comprising recurring organoonium groups, III) polymers comprising a pendant thiosulfate (Bunte salt) group, IV) polymers comprising recurring units comprising carboxy or carboxylate groups.

Each class of ionomers is described in turn. The inkjet inks can comprise one or more mixtures of ionomers from each class, or a mixture of one or more ionomers of two or more classes as long as the mixed ionomers are compatible with each other.

Class I Ionomers:

The Class I ionomers generally have a molecular weight of at least 1000 and can be any of a wide variety of vinyl homopolymers and copolymers having the requisite positively-charged groups. They are prepared from ethylenically unsaturated polymerizable monomers using any conventional polymerization technique. Preferably, the polymers are copolymers prepared from two or more ethylenically unsaturated polymerizable monomers, at least one of which contains the desired pendant positively-charged group, and another monomer that is capable of providing other properties, such as crosslinking sites and possibly adhesion to the support. Procedures and reactants needed to prepare these polymers are well known. With the additional teaching provided herein, the known polymer reactants and conditions can be modified by one skilled in the art to attach a suitable cationic group.

The presence of a cationic group apparently provides or facilitates the "switching" of the printed layer from hydrophilic to hydrophobic in the areas that have been exposed to heat in some manner, when the cationic group reacts with its counterion. The net result is the loss of charge. Such reactions are more easily accomplished when the anion is more nucleophilic and/or more basic. For example, an acetate anion is typically more reactive than a chloride anion. By varying the chemical nature of the anion, the reactivity of the heat-sensitive polymer can be modified to provide optimal image resolution for a given set of conditions (for example, laser hardware and power, and printing press needs) balanced with sufficient ambient shelf life. Useful anions include the halides, carboxylates, sulfates, borates and sulfonates. Representative anions include, but are not limited to, chloride, bromide, fluoride, acetate, tetrafluoroborate, formate, sulfate, p-toluenesulfonate and others readily apparent to one skilled in the art. The halides and carboxylates are preferred.

The aromatic cationic group is present in sufficient recurring units of the polymer so that the heat-activated reaction described above can provide desired hydrophobicity of the imaged printing layer. The groups can be attached along a principal backbone of the polymer, or to one or more branches of a polymeric network, or both. The aromatic groups generally comprise 5 to 10 carbon, nitrogen, sulfur or oxygen atoms in the ring (at least one being a positively-charged nitrogen atom), to which is attached a branched or unbranched, substituted or unsubstituted alkyl group. Thus, the recurring units containing the aromatic heterocyclic group can be represented by the following Structure I:

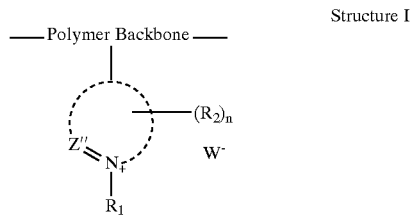

Structure I

In this structure, $R_1$ is a branched or unbranched, substituted or unsubstituted alkyl group having from 1 to 12 carbon atoms (such as methyl, ethyl, n-propyl, isopropyl, t-butyl, hexyl, methoxymethyl, benzyl, neopentyl and dodecyl). Preferably, $R_1$ is a substituted or unsubstituted, branched or unbranched alkyl group having from 1 to 6 carbon atoms, and most preferably, it is substituted or unsubstituted methyl group.

$R_2$ can be a substituted or unsubstituted alkyl group (as defined above, and additionally a cyanoalkyl group, a hydroxyalkyl group or alkoxyalkyl group), substituted or unsubstituted alkoxy having 1 to 6 carbon atoms (such as methoxy, ethoxy, isopropoxy, oxymethylmethoxy, n-propoxy and butoxy), a substituted or unsubstituted aryl group having 6 to 14 carbon atoms in the ring (such as phenyl, naphthyl, anthryl, p-methoxyphenyl, xylyl, and alkoxycarbonylphenyl), halo (such as chloro and bromo), a substituted or unsubstituted cycloalkyl group having 5 to 8 carbon atoms in the ring (such as cyclopentyl, cyclohexyl and 4-methylcyclohexyl), or a substituted or unsubstituted heterocyclic group having 5 to 8 atoms in the ring including at least one nitrogen, sulfur or oxygen atom in the ring (such as pyridyl, pyridinyl, tetrahydrofuranyl and tetrahydropyranyl). Preferably, $R_2$ is substituted or unsubstituted methyl or ethyl group.

$Z''$ represents the carbon and any additional nitrogen, oxygen, or sulfur atoms necessary to complete the 5- to 10-membered aromatic N-heterocyclic ring that is attached to the polymeric backbone. Thus, the ring can include two or more nitrogen atoms in the ring (for example, N-alkylated diazinium or imidazolium groups), or N-alkylated nitrogen-containing fused ring systems including, but not limited to, pyridinium, quinolinium, isoquinolinium acridinium, phenanthradinium and others readily apparent to one skilled in the art.

$W^-$ is a suitable anion as described above. Most preferably it is acetate or chloride.

Also in Structure I, n is 0 to 6, and is preferably 0 or 1. Most preferably, n is 0.

The aromatic heterocyclic ring can be attached to the polymeric backbone at any position on the ring. Preferably, there are 5 or 6 atoms in the ring, one or two of which are nitrogen. Thus, the N-alkylated nitrogen containing aromatic group is preferably imidazolium or pyridinium and most preferably it is imidazolium.

The recurring units containing the cationic aromatic heterocycle can be provided by reacting a precursor polymer containing unalkylated nitrogen containing heterocyclic units with an appropriate alkylating agent (such as alkyl sulfonate esters, alkyl halides and other materials readily apparent to one skilled in the art) using known procedures and conditions.

Preferred Class I ionomers can be represented by the following Structure II:

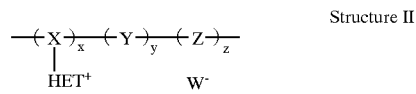

Structure II wherein X represents recurring units to which the N-alkylated nitrogen containing aromatic heterocyclic groups (represented by $HET^+$) are attached, Y represents recurring units derived from ethylenically unsaturated polymerizable monomers that may provide active sites for crosslinking using any of various crosslinking mechanisms (described below), $W^-$ is a suitable anion as described above, and Z represents recurring units derived from any additional ethylenically unsaturated polymerizable monomers. The various repeating units are present in suitable amounts, as represented by x being from about 15 to 100 mol %, y being from about 0 to about 20 mol %, and z being from 0 to 85 mol %. Preferably, x is from about 20 to about 98 mol %, y is from about 2 to about 10 mol % and z is from 0 to about 70 mol %.

Crosslinking of the ionomers can be provided in a number of ways. There are numerous monomers and methods for crosslinking that are familiar to one skilled in the art. Some representative crosslinking strategies include, but are not necessarily limited to:

a) reacting an amine or carboxylic acid or other Lewis basic units with diepoxide crosslinkers, b) reacting an epoxide units within the polymer with difunctional amines, carboxylic acids, or other difunctional Lewis basic unit, c) irradiative or radical-initiated crosslinking of double bond-containing units such as acrylates, methacrylates, cinnamates, or vinyl groups, d) reacting a multivalent metal salts with ligating groups within the polymer (the reaction of zinc salts with carboxylic acid-containing polymers is an example), e) using crosslinkable monomers that react via the Knoevenagel condensation reaction, such as (2-acetoacetoxy)ethyl acrylate and methacrylate, f) reacting an amine, thiol, or carboxylic acid groups with a divinyl compound (such as bis (vinylsulfonyl) methane) via a Michael addition reaction, g) reacting a carboxylic acid units with crosslinkers having multiple aziridine units, h) reacting a crosslinkers having multiple isocyanate units with amines, thiols, or alcohols within the polymer, i) mechanisms involving the formation of interchain sol-gel linkages [such as the use of the 3-(trimethoxysilyl) propylmethacrylate monomer], j) oxidative crosslinking using an added radical initiator (such as a peroxide or hydroperoxide), k) autooxidative crosslinking, such as employed by alkyd resins, l) sulfur vulcanization, and m) processes involving ionizing radiation.

Monomers having crosslinkable groups or active crosslinkable sites (or groups that can serve as attachment points for crosslinking additives, such as epoxides) can be copolymerized with the other monomers noted above. Such monomers include, but are not limited to, 3-(trimethoxysilyl)propyl acrylate or methacrylate, cinnamoyl acrylate or methacrylate, N-methoxymethyl methacrylamide, N-aminopropylacrylamide hydrochloride, acrylic or methacrylic acid and hydroxyethyl methacrylate.

Additional monomers that provide the repeating units represented by "Z" in the Structure II above include any useful hydrophilic or oleophilic ethylenically unsaturated polymerizable monomer that may provide desired physical or printing properties to the hydrophilic imaging layer. Such monomers include, but are not limited to, acrylates, methacrylates, isoprene, acrylonitrile, styrene and styrene derivatives, acrylamides, methacrylamides, acrylic or methacrylic acid and vinyl halides.

Representative Class I ionomers are identified below as Polymers 1, 3, 4, and 6. Mixtures of these polymers can also be used. Polymers 2 and 5 below are precursors to useful Class I ionomers. Further details of these ionomers and methods for their preparation are provided in U.S. Pat. No. 6,180,831.

Polymer 1: Poly (1-vinyl-3-methylimidazolium chloride-co-N-(3-aminopropyl) methacrylamide hydrochloride), Polymer 2: Poly(methyl methacrylate-co-4-vinylpyridine), Polymer 3: Poly(methyl methacrylate-co-N-methyl-4-vinylpyridinium formate), Polymer 4: Poly(methyl methacrylate-co-N-butyl-4 vinylpyridinium formate), Polymer 5: Poly(methyl methacrylate-co-2-vinylpyridine), and Polymer 6: Poly(methyl methacrylate-co-N-methyl-2-vinylpyridinium formate).

Class II Ionomers

The Class II ionomers also generally have a molecular weight of at least 1000. They can be any of a wide variety of vinyl or non-vinyl homopolymers and copolymers.

Non-vinyl ionomers of Class II include, but are not limited to, polyesters, polyamides, polyamide-esters, polyarylene oxides and derivatives thereof, polyurethanes, polyxylylenes and derivatives thereof, silicon-based sol gels (solsesquioxanes), polyamidoamines, polyimides, polysulfones, polysiloxanes, polyethers, poly(ether ketones), poly(phenylene sulfide) ionomers, polysulfides and polybenzimidazoles. Preferably, such non-vinyl polymers are silicon based sol gels, polyarylene oxides, poly (phenylene sulfide) ionomers or polyxylylenes, and most preferably, they are poly(phenylene sulfide) ionomers. Procedures and reactants needed to prepare all of these types of polymers are well known. With the additional teaching provided herein, the known polymer reactants and conditions can be modified by a skilled artisan to incorporate or attach a suitable cationic organoonium moiety.

Silicon-based sol gels useful in this invention can be prepared as a crosslinked polymeric matrix containing a silicon colloid derived from di-, tri- or tetraalkoxy silanes. These colloids are formed by methods described in U.S. Pat. No. 2,244,325 (Bird), U.S. Pat. No. 2,574,902 (Bechtold et al.), and U.S. Pat. No. 2,597,872 (Iler). Stable dispersions of such colloids can be conveniently purchased from companies such as the DuPont Company. A preferred sol-gel uses N-trimethoxysilylpropyl-N,N,N-trimethylammonium acetate both as the crosslinking agent and as the polymer layer forming material.

The presence of an organoonium moiety that is chemically incorporated into the ionomer in some fashion apparently provides or facilitates the "switching" of the printed layer from hydrophilic to oleophilic in the heat exposed areas upon exposure to energy that provides or generates heat, when the cationic moiety reacts with its counterion. The net result is the loss of charge. Such reactions are more easily accomplished when the anion of the organoonium moiety is more nucleophilic and/or more basic, as described above for the Class I polymers.

The organoonium moiety within the polymer can be chosen from a trisubstituted sulfur moiety (organosulfonium), a tetrasubstituted nitrogen moiety (organoammonium), or a tetrasubstituted phosphorous moiety (organophosphonium). The tetrasubstituted nitrogen (organoammonium) moieties are preferred. This moiety can be chemically attached to (that is, pendant) the polymer backbone, or incorporated within the backbone in some fashion, along with the suitable counterion. In either embodiment, the organoonium moiety is present in sufficient repeating units of the polymer (at least 15 mol %) so that the heat-activated reaction described above can occur to provide desired hydrophobicity of the imaging layer. When chemically attached as a pendant group, the organoonium moiety can be attached along a principal backbone of the polymer, or to one or more branches of a polymeric network, or both. When chemically incorporated within the polymer backbone, the moiety can be present in either cyclic or acyclic form, and can also form a branching point in a polymer network. Preferably, the organoonium moiety is provided as a pendant group along the polymeric backbone. Pendant organoonium moieties can be chemically attached to the polymer backbone after polymer formation, or functional groups on the polymer can be converted to organoonium moieties using known chemistry. For example, pendant quaternary ammonium groups can be provided on a polymeric backbone by the displacement of a "leaving group" functionality (such as a halogen) by a tertiary amine nucleophile. Alternatively, the organoonium group can be present on a monomer that is then polymerized or derived by the alkylation of a neutral heteroatom unit (trivalent nitrogen or phosphorous group or divalent sulfur group) already incorporated within the polymer.

The organoonium moiety is substituted to provide a positive charge. Each substituent must have at least one carbon atom that is directly attached to the sulfur, nitrogen or phosphorus atom of the organoonium moiety. Useful substituents include, but are not limited to, substituted or unsubstituted alkyl groups having 1 to 12 carbon atoms and preferably from 1 to 7 carbon atoms (such as methyl, ethyl, n-propyl, isopropyl, t-butyl, hexyl, methoxyethyl, isopropoxymethyl, substituted or unsubstituted aryl groups (phenyl, naphthyl, p-methylphenyl, m-methoxyphenyl, p-chlorophenyl, p-methylthiophenyl, p-N,N-dimethylaminophenyl, xylyl, methoxycarbonylphenyl and cyanophenyl), and substituted or unsubstituted cycloalkyl groups having 5 to 8 carbon atoms in the carbocyclic ring (such as cyclopentyl, cyclohexyl, 4-methylcyclohexyl and 3-methylcyclohexyl). Other useful substituents would be readily apparent to one skilled in the art, and any combination of the expressly described substituents is also contemplated.

The organoonium moieties include any suitable anion as described above for the Class I ionomers. The halides and carboxylates are preferred.

Class II ionomers can comprise both vinyl and non-vinyl backbones. Both types are composed of recurring units having one or more types of organoonium group. For example, such an ionomer can have recurring units with both organoammonium groups and organosulfonium groups. It is also not necessary that all of the organoonium groups have the same alkyl substituents. Useful anions in these ionomers are the same as those described above for the non-vinyl polymers. Similarly, the halides and carboxylates are preferred.

The organoonium group is present in sufficient recurring units of the ionomer so that the heat-activated reaction described above can occur to provide desired hydrophobicity of the printed image. The group can be attached along a principal backbone of the polymer, or to one or more branches of a polymeric network, or both. Pendant groups can be chemically attached to the polymer backbone after polymer formation using known chemistry. For example, pendant organoammonium, organophosphonium or organosulfonium groups can be provided on a polymeric backbone by the nucleophilic displacement of a pendant leaving group (such as a halide or sulfonate ester) on the polymeric chain by a trivalent amine, divalent sulfur or trivalent phosphorous nucleophile. Pendant onium groups can also be provided by alkylation of corresponding pendant neutral heteroatom groups (nitrogen, sulfur or phosphorous) using any commonly used alkylating agent such as alkyl sulfonate esters or alkyl halides. Alternatively a monomer precursor containing the desired organoammonium, organophosphonium or organosulfonium group may be polymerized to yield the desired polymer.

The organoammonium, organophosphonium or organosulfonium group in the vinyl ionomer provides the desired positive charge. Generally, preferred pendant organoonium groups can be illustrated by the following Structures III, IV, and V:

Structure III

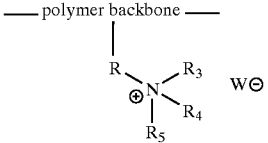

Structure IV

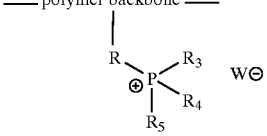

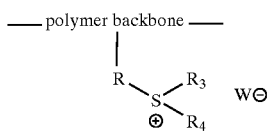

Structure V

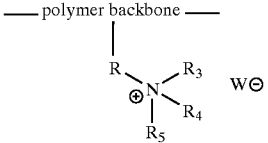

wherein R is a substituted or unsubstituted alkylene group having 1 to 12 carbon atoms that can also include one or more oxy, thio, carbonyl, amido or alkoxycarbonyl groups with the chain (such as methylene, ethylene, isopropylene, methylenephenylene, methyleneoxymethylene, n-butylene, and hexylene), a substituted or unsubstituted arylene group having 6 to 10 carbon atoms in the ring (such as phenylene, naphthylene, xylylene, and 3-methoxyphenylene), or a substituted or unsubstituted cycloalkylene group having 5 to 10 carbon atoms in the ring (such as 1,4-cyclohexylene, and 3-methyl-1,4-cyclohexylene). In addition, R can be a combination of two or more of the defined substituted or unsubstituted alkylene, arylene and cycloalkylene groups. Preferably, R is a substituted or unsubstituted ethyleneoxycarbonyl or phenylenemethylene group. Other useful substituents not listed herein could include combinations of any of those groups listed above as would be readily apparent to one skilled in the art.

$R_3$, $R_4$, and $R_5$ are independently substituted or unsubstituted alkyl group having 1 to 12 carbon atoms (such as methyl, ethyl, n-propyl, isopropyl, t-butyl, hexyl, hydroxymethyl, methoxymethyl, benzyl, methylenecarboalkoxy, and a cyanoalkyl), a substituted or unsubstituted aryl group having 6 to 10 carbon atoms in the carbocyclic ring (such as phenyl, napbthyl, xylyl, p-methoxyphenyl, p-methylphenyl, m-methoxyphenyl, p-chlorophenyl, p-methylthiophenyl, p-N,N-dimethylaminophenyl, methoxycarbonylphenyl, and cyanophenyl), or a substituted or unsubstituted cycloalkyl group having 5 to 10 carbon atoms in the carbocyclic ring (such as 1,3- or 1,4-cyclohexyl). Alternatively, any two of $R_3$, $R_4$, and $R_5$ can be combined to form a substituted or unsubstituted heterocyclic ring with the charged phosphorus, sulfur or nitrogen atom, the ring having 4 to 8 carbon, nitrogen, phosphorus, sulfur or oxygen atoms in the ring. Such heterocyclic rings include, but are not limited to, substituted or unsubstituted morpholinium, piperidinium, and pyrrolidinium groups for Structure V. Other useful substituents for these various groups would be readily apparent to one skilled in the art, and any combinations of the expressly described substituents are also contemplated.

Preferably, $R_3$, $R_4$, and $R_5$ are independently substituted or unsubstituted methyl or ethyl groups.

$W^-$ is any suitable anion as described above for the Class I polymers. Acetate and chloride are preferred anions.

Ionomers containing quaternary ammonium groups as described herein are most preferred vinyl Class II polymers.

In preferred embodiments, the vinyl Class II ionomers useful in the practice of this invention can be represented by the following Structure VI:

Structure VI

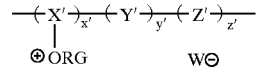

wherein X' represents recurring units to which the organoonium groups ("ORG") are attached, Y' represents recurring units derived from ethylenically unsaturated polymerizable monomers that may provide active sites for crosslinking using any of various crosslinking mechanisms (described below), W⁻ is a suitable anion (as defined above), and Z' represents recurring units derived from any additional ethylenically unsaturated polymerizable monomers. The various recurring units are present in suitable amounts, as represented by x' being from about 15 to about 99 mol %, y' being from about 1 to about 20 mol %, and z' being from 0 to about 84 mol %. Preferably, x' is from about 20 to about 98 mol %, y' is from about 2 to about 10 mol % and z' is from 0 to about 70 mol %.

Crosslinking of the vinyl ionomer can be achieved in the same way as described above for the Class I polymers.

Additional monomers that provide the additional recurring units represented by Z' in Structure VI include any useful hydrophilic or oleophilic ethylenically unsaturated polymerizable monomer that may provide desired physical or printing properties to the imaging layer. Such monomers include, but are not limited to, acrylates, methacrylates, acrylonitrile, isoprene, styrene and styrene derivatives, acrylamides, methacrylamides, acrylic or methacrylic acid and vinyl halides.

Representative Class II non-vinyl ionomers are identified herein below as Polymers 7–8 and 10. Mixtures of these polymers can also be used. Polymer 9 is a precursor to Polymer 10. Representative vinyl ionomers of Class II include Polymers 11–18 as identified herein below, and Polymer 14 is most preferred. A mixture of any two or more of these ionomers can also by used. Further details of such ionomers and method for preparing them are provided in U.S. Pat. No. 6,109,830 (noted above).

Polymer 7: Poly(p-xylidenetetrahydrothiophenium chloride),

Polymer 8: Poly[phenylene sulfide-co-methyl(4-thiophenyl)sulfonium chloride],

Polymer 9: Brominated poly(2,6-dimethyl-1,4-phenylene oxide),

Polymer 10: Dimethyl sulfonium bromide derivative of poly(2,6-dimethyl-1,4-phenylene oxide), Polymer 11: Poly[methyl methacrylate-co-2-trimethylammoniumethyl methacrylic chloride-co-N-(3-aminopropyl) methacrylamide hydrochloride], Polymer 12: Poly[methyl methacrylate-co-2-trimethylammoniumethyl methacrylic acetate-co-N-(3-aminopropyl) methacrylamide], Polymer 13: Poly[methyl methacrylate-co-2-trimethylammoniumethyl methacrylic fluoride-co-N-(3-aminopropyl) methacrylamide hydrochloride], Polymer 14: Poly[vinylbenzyl trimethylammonium chloride-co-N-(3-aminopropyl) methacrylamide hydrochloride], Polymer 15: Poly([vinylbenzyltrimethyl-phosphonium acetate-co-N-(3-aminopropyl) methacrylamide hydrochloride], Polymer 16: Poly [dimethyl-2-(methacryloyloxy) ethyl-sulfonium chloride-co-N-(3-aminopropyl) methacrylamide hydrochloride], Polymer 17: Poly [vinylbenzyldimethylsulfonium methylsulfate], and Polymer 18: Poly[vinylbenzyldimethylsulfonium chloride].

Class III Ionomers

Each of the Class III ionomers has a molecular weight of at least 1000, and preferably of at least 5000. For example, the ionomers can be vinyl homopolymers or copolymers prepared from one or more ethylenically unsaturated polymerizable monomers that are reacted together using known polymerization techniques and reactants. Alternatively, they can be addition homopolymers or copolymers (such as polyethers) prepared from one or more heterocyclic monomers that are reacted together using known polymerization techniques and reactants. Additionally, they can be condensation type polymers (such as polyesters, polyimides, polyamides or polyurethanes) prepared using known polymerization techniques and reactants. Whatever the type of polymers, at least 10 mol % (preferably 15 mol %) of the total recurring units in the polymer comprise the necessary heat-activatable thiosulfate groups.

The Class III ionomers useful in the practice of this invention can be represented by the following Structure VII wherein the thiosulfate group (or Bunte salt) is a pendant group:

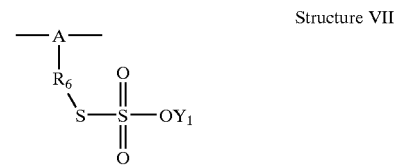

Structure VII wherein A represents a polymeric backbone, $R_6$ is a divalent linking group, and $Y_1$. is hydrogen or a cation.

Useful polymeric backbones include, but are not limited to, vinyl polymers, polyethers, polyimides, polyamides, polyurethanes and polyesters. Preferably, the polymeric backbone is a vinyl polymer or polyether.

Useful $R_6$ linking groups include $—(COO)_{n'}(Z_1)_m—$ wherein n' is 0 or 1, m is 0 or 1, and $Z_1$ is a substituted or unsubstituted alkylene group having 1 to 6 carbon atoms (such as methylene, ethylene, n-propylene, isopropylene, butylenes, 2-hydroxypropylene and 2-hydroxy-4-azahexylene) that can have one or more oxygen, nitrogen or sulfur atoms in the chain, a substituted or unsubstituted arylene group having 6 to 14 carbon atoms in the aromatic ring (such as phenylene, naphthalene, anthracylene and xylylene), or a substituted or unsubstituted arylenealkylene (or alkylenearylene) group having 7 to 20 carbon atoms in the chain (such as p-methylenephenylene, phenylenemethylene-phenylene, biphenylene and phenyleneisopropylenephenylene). In addition, $R_6$ can be an alkylene group, an arylene group, in an arylenealkylene group as defined above for $Z_1$.

Preferably, $R_6$ is an alkylene group of 1 to 3 carbon atoms, an arylene group of 6 carbon atoms in the aromatic ring, an arylenealkylene group of 7 or 8 carbon atoms in the chain, or $—COO(Z_1)_m—$ wherein $Z_1$ is methylene, ethylene or phenylene. Most preferably, $R_6$ is phenylene, methylene or —COO—.

$Y_1$ is hydrogen, ammonium ion, or a metal ion (such as sodium, potassium, magnesium, calcium, cesium, barium, zinc or lithium ion). Preferably, $Y_1$ is hydrogen, sodium ion, ammonium ion, or potassium ion.

As the thiosulfate group is generally arranged pendant to the backbone, preferably it is part of an ethylenically unsaturated polymerizable monomer that can be polymerized using conventional techniques to form vinyl homopolymers of the thiosulfate-containing recurring units, or vinyl copolymers when copolymerized with one or more additional ethylenically unsaturated polymerizable monomers. The thiosulfate-containing recurring units generally comprise at least 10 mol % of all recurring units in the polymer, preferably they comprise from about 15 to 100 mol % of all recurring units. A polymer can include more than one type of repeating unit containing a thiosulfate group as described herein.

Ionomers having the above-described thiosulfate group are believed to crosslink and to switch from hydrophilic thiosulfate to hydrophobic disulfide (upon loss of sulfate) with heating.

Thiosulfate-containing molecules (or Bunte salts) can be prepared from the reaction between an alkyl halide and thiosulfate salt as taught by Bunte, *Chem.Ber.* 7, 646, 1884. Polymers containing thiosulfate groups can either be prepared from functional monomers or from preformed polymers. Polymers can also be prepared from preformed polymers in a similar manner as described in U.S. Pat. No. 3,706,706 (Vandenberg). Thiosulfate-containing molecules can also be prepared by reaction of an alkyl epoxide with a thiosulfate salt, or between an alkyl epoxide and a molecule containing a thiosulfate moiety (such as 2-aminoethanethiosulfuric acid), and the reaction can be performed either on a monomer or polymer as illustrated by Thames, *Surf Coating*, 3 (Waterborne Coat.), Chapter 3, pp. 125–153, Wilson et al. (Eds.).

Details for making ethylenically unsaturated polymerizable monomers and Class III ionomers are provided in U.S. Pat. No. 5,985,514 (noted above).

Vinyl polymers can be prepared by copolymerizing monomers containing the thiosulfate functional groups with one or more other ethylenically unsaturated polymerizable monomers to modify polymer chemical or functional properties, to optimize imaging member performance, or to introduce additional crosslinking capability.

Useful additional ethylenically unsaturated polymerizable monomers include, but are not limited to, acrylates (including methacrylates) such as ethyl acrylate, n-butyl acrylate, methyl methacrylate and t-butyl methacrylate, acrylamides (including methacrylamides), an acrylonitrile (including methacrylonitrile), vinyl ethers, styrenes, vinyl acetate, dienes (such as ethylene, propylene, 1,3-butadiene and isobutylene), vinyl pyridine and vinylpyrrolidone. Acrylamides, acrylates and styrenes are preferred.

Representative Class III ionomers include the following Polymers 19–27:

Polymer 19: Poly(chloromethyl-ethylene oxide-co-sodium thiosulfate methyl-ethylene oxide), Polymer 20: Poly(vinyl benzyl thiosulfate sodium salt-co-methyl methacylate), Polymer 21: Poly[vinyl benzyl thiosulfate sodium salt-co-N-(3-aminopropyl)methacylamide hydrochloride], Polymer 22: Poly(vinyl benzyl thiosulfate sodium salt-co-styrene), Polymer 23: Poly(vinyl benzyl thiosulfate sodium salt), Polymer 24: Poly[vinyl benzyl thiosulfate sodium salt -co-N-(3-aminopropyl)methacrylamide hydrochloride], Polymer 25: Poly[2-hydroxy-3-sodium thiosulfate-propyl methacrylate-co-2-(methacryloyloxy)ethyl acetoacetate], Polymer 26: Poly(2-sodium thiosulfate-ethyl methacrylate), and Polymer 27: Poly(4-aza-2-hydroxy-6-sodium thiosulfate-hexyl methacrylate).

Class IV Ionomers

Additional heat-sensitive ionomers useful in this invention comprise random recurring units at least some of which comprise carboxy (free acid) or various carboxylates (salts). The ionomers generally have a molecular weight of at least 2,000.

The ionomers randomly comprise one or more types of carboxy- or carboxylate-containing recurring units (or equivalent anhydride units) identified as "$A_1$" below in Structure VIII and optionally one or more other recurring units (non-carboxylated) denoted as "$B_1$" in Structure VIII.

The carboxy or carboxylate group can be linked directly to the polymer backbone that is derived from the "$A_1$" monomers, or they can be connected by a linking group identified as "$X_1$" in Structure VIII below. This linking group can be any divalent aliphatic, alicyclic or aromatic group that does not adversely affect the polymer's heat-sensitivity. For example, "$X_1$" can be a substituted or unsubstituted alkylene group having 1 to 16 carbon atoms (such as methylene, ethylene, isopropylene, n-propylene and n-butylene), a substituted or unsubstituted arylene group having 6 to 10 carbon atoms in the arylene ring (such as m- or p-phenylene and naphthylenes), substituted or unsubstituted combinations of alkylene and arylene groups (such arylenealkylene, arylenealkylenearylene and alkylenearylenealkylene groups), and substituted or unsubstituted N-containing heterocyclic groups. Any of these defined groups can be connected in a linking chain with one or more amino, carbonamido, oxy, thio, amido, oxycarbonyl, aminocarbonyl, alkoxycarbonyl, alkanoyloxy, alkanoylamino, or alkaminocarbonyl groups. Particularly useful "$X_1$" linking groups contains an ester or amide connected to an alkylene group or arylene group (as defined above), such as when the ester and amide groups are directly bonded to "$A_1$".

In some embodiments of Class IV polymers, the $X_1$ linking groups include one or more electron withdrawing groups (groups with a positive Hammett $\sigma_m$) that are either within the linking chain or attached thereto. Hammett $\sigma_m$ values are well known in the art for many chemical groups and is defined in numerous publications including *Prog. Phys. Org. Chem.* 2, 323, 1964, Carpenter, B. K., *Determination of Organic Reaction Mechanisms*, John Wiley & Sons, New York, 1984, pp. 144–146, and *J. Med. Chem.,* 16, 1207, 1973. For example, the $X_1$ linking groups can include one or more of the following groups either within the linking chain or attached thereto: —O—, —S—, —Se—, —$NR_{11}$—, —CO—, —$SO_2$, —PO—, —$SiR_{11}R_{12}$—, —CS—, halo, cyano, —$OR_{11}$, —$OCOR_{11}$, —$OCOOR_{11}$, —$OCONR_{11}R_{12}$, —$OSO_2R_{11}$, —$COR_{11}$, —$COOR_{11}$, —$CONR_{11}R_{12}$, —$NR_{11}R_{12}$, —$NR_{11}COR_{12}$, —$NR_{11}COOR_{12}$, —$NR_{11}CONR_{11}R_{12}$, —$SR_{11}$, —$SOR_{11}$, —$SO_2R_{11}$, —$SO_3R_{11}$, and other groups that would be readily apparent to one skilled in the art. $R_{11}$ and $R_{12}$ are independently any suitable organic monovalent substituent that would be readily apparent to one skilled in the art. Preferred electron withdrawing groups that can be a part of $X_1$ include —$SO_2$, cyano, —$COR_{11}$, and —$SOR_{11}$. Specific examples of electron withdrawing groups are also shown in EP-A-1,075,942 (Fuji Photo), pages 10–12, incorporated herein by reference.

In Structure VIII below, p is 0 or 1, and preferably p is 0.

VIII

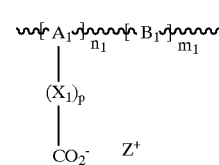

Additional monomers (non-carboxylate monomers) that provide the recurring units represented by "$B_1$" in Structure VIII above include any useful hydrophilic or oleophilic ethylenically unsaturated polymerizable comonomers that may provide desired physical or printing properties of printed image or which provide crosslinkable functionalities. One or more "$B_1$" monomers maybe used to provide these recurring units, including but not limited to, acrylates, methacrylates, styrene and its derivatives, acrylamides, methacrylamides, olefins, vinyl halides, and any monomers (or precursor monomers) that do not contain carboxy or carboxylate groups.

The carboxy- or carboxylate-containing ionomer may be chosen or derived from a variety of polymers and copolymer classes including, but not necessarily limited to polyamic acids, polyesters, polyamides, polyurethanes, silicones, proteins (such as modified gelatins), polypeptides, and polymers and copolymers based on ethylenically unsaturated polymerizable monomers such as acrylates, methacrylates, acrylamides, methacrylamides, vinyl ethers, vinyl esters, alkyl vinyl ethers, maleic acid/anhydride, itaconic acid/anhydride, styrenics, acrylonitrile, and olefins such as butadiene, isoprene, propylene, and ethylene. A parent carboxy-containing polymer may contain more than one type of carboxylic acid-containing monomer. Certain monomers, such as maleic acid/anhydride and itaconic acid/anhydride may contain more than one carboxylic acid unit. Preferably, the parent carboxylic acid-containing polymer is an addition polymer or copolymer containing acrylic acid, methacrylic acid, maleic acid or anhydride, or itaconic acid or anhydride or a conjugate base or hydrolysis product thereof.

In Structure VIII, $n_1$ represents about 25 to 100 mol % (preferably from about 50 to 100 mol %), and $m_1$ represents 0 to about 75 mol % (preferably from 0 to about 50 mol %).

While Structure VIII could be interpreted to show ionomers derived from only two ethylenically unsaturated polymerizable monomers, it is intended to include terpolymers and other polymers derived from more than two monomers.

The carboxy or carboxylate groups must be present in the heat-sensitive ionomer useful in this invention in such a quantity as to provide a minimum of one mole of the carboxy or carboxylate groups per 1300 g of polymer and a maximum of one mole of carboxy or carboxylate groups per 60 g of polymer. Preferably, this ratio (moles of carboxy or carboxylate groups to grams of polymer) is from about 1:600 to about 1:60 and more preferably, this ratio is from about 1:500 to about 1:100. This parameter is readily determined from knowledge of the molecular formula of a given ionomer.

In Structure VIII noted above, $Z^+$ is any suitable monovalent cation including but not limited to hydrogen, alkali metal cations (such as sodium or potassium), primary, secondary, tertiary, or quaternary ammonium ions, phosphonium ions, sulfonium ions, pyridinium, morpholinium, and alkyl imidazolium ions. Sodium, potassium, and quaternary ammonium ions are preferred, and quaternary ammonium ions (described below) are most preferred. The ionomer can be derived from monomers that comprise different cations so that the ionomer chain has various cations distribution throughout the molecule. Preferably, all of the cations are the same.

A most preferred $Z^+$ cation is a quaternary ammonium ion defined as $-N^+(R_7)(R_8)(R_9)(R_{10})$ in which $R_7$, $R_8$, $R_9$ and $R_{10}$ are hydrogen, independently substituted or unsubstituted alkyl groups having 1 to 12 carbon atoms [such as methyl, ethyl, n-propyl, isopropyl, t-butyl, hexyl, hydroxyethyl, 2-propanonyl, ethoxycarbonymethyl, benzyl, substituted benzyl (such as 4-methoxybenzyl, o-bromobenzyl, and p-trifluoromethylbenzyl), and cyanoalkyl], or substituted or unsubstituted aryl groups having 6 to 14 carbon atoms in the carbocyclic ring (such as phenyl, naphthyl, xylyl, p-methoxyphenyl, p-methylphenyl, m-methoxyphenyl, p-chlorophenyl, p-methylthiophenyl, p-N,N-dimethylaminophenyl, methoxycarbonylphenyl, and cyanophenyl). Alternatively, any two, three or four of $R_7$, $R_8$, $R_9$ and $R_{10}$ can be combined to form a ring (or two rings for four substituents) with the quaternary nitrogen atom, the ring having 5 to 14 carbon, oxygen, sulfur and nitrogen atoms in the ring. Such rings include, but are not limited to, morpholine, piperidine, pyrrolidine, carbazole, indoline, and isoindoline rings. The nitrogen atom can also be located at the tertiary position of the fused ring. Other useful substituents for these various groups would be readily apparent to one skilled in the art, and any combinations of the expressly described substituents are also contemplated.

Alternatively, multi-cationic ionic species containing more than one quaternary ammonium unit covalently bonded together and having charges greater than +1 (for example +2 for diammonium ions, and +3 for triammonium ions) may be used in this invention.

Preferably, the nitrogen of the quaternary ammonium ion is directly bonded to one or more benzyl groups or one or two phenyl groups. Alternatively, the nitrogen atom is part of one or two five-membered rings, or one or two indoline or isoindoline rings and has a molecular weight of less than 400.

The use of a spiro ammonium cation in which the nitrogen lies at the vertex of two intersecting rings is especially preferred. When a carboxylate polymer containing such an ammonium counterion is thermally imaged, small molecule amines are not given off and hence the problem of odor during imaging is alleviated. Similarly, the use of a benzyl-tris-hydroxyethyl ammonium ion may result in the release of triethanolamine that is odorless and relatively benign.

The heat-sensitive ionomers of Class IV may be readily prepared using many methods that will be obvious to one skilled in the art. Many quaternary ammonium salts and carboxylic acid or anhydride-containing polymers are commercially available. Others can be readily synthesized using preparative techniques that would be obvious to one skilled in the art. Carboxy- or anhydride-containing polymers can be converted to the desired quaternary ammonium carboxylate salts by a variety of methods including, but not necessarily limited to:

1) the reaction of a carboxylic acid- or acid anhydride-containing polymer with the hydroxide salt of the desired quaternary ammonium ion,
2) the use of ion exchange resin containing the desired quaternary ammonium ion,
3) the addition of the desired ammonium ion to a solution of the carboxylic acid-containing polymer or a salt thereof followed by dialysis,
4) the addition of a volatile acid salt of the desired quaternary ammonium ion (such as an acetate or formate salt) to the carboxylic acid-containing polymer followed by evaporation of the volatile component upon drying,
5) electrochemical ion exchange techniques,
6) the polymerization of monomers containing the desired quaternary ammonium carboxylate units, and
7) the combination of a specific salt of the carboxylic acid-containing polymer and a specific quaternary ammonium salt, both chosen such that the undesired counterions will form an insoluble ionic compound in a chosen solvent and precipitate.

Preferably, the first method is employed.

Although it is especially preferred that all of the carboxy (or latent carboxylic acid) functionalities of the ionomer are converted to the desired salts (especially quaternary ammonium salts), imaging compositions in which the ionomer is incompletely converted may still retain satisfactory imageability. Preferably, at least 50 monomer percent of the carboxylic acid (or equivalent anhydride) containing monomers are reacted to form the desired carboxylates.

Preferred embodiments of Class IV ionomers are crosslinked. Crosslinking can be provided in a number of ways as described above for the Class I ionomers. Ethylenically unsaturated polymerizable monomers having crosslinkable groups (or groups that can serve as attachment points for crosslinking additives) can be copolymerized with the other monomers as noted above. Such monomers include, but are not limited to, 3-(trimethylsilyl)propyl acryl ate or methacrylate, cinnamoyl acryl ate or methacrylate, N-methoxymethyl methacrylamide, N-aminopropylmethacrylamide hydrochloride, acrylic or methacrylic acid and hydroxyethyl methacrylate.

Preferably, crosslinking is provided by the addition of an epoxy-containing resin to a quaternary ammonium carboxylate ionomer or by the reaction of a bisvinylsulfonyl compound with amine containing units (such as N-aminopropylmethacrylamide) within the ionomer. CR-5L (an epoxide resin sold by Esprit Chemicals) can be used for this purpose.

In still more preferred embodiments of Class IV ionomers, the quaternary ammonium counterion of the carboxylate functionalities may be any ammonium ion in which the nitrogen is covalently bound to a total of four alkyl or aryl substituents as defined above, provided at least one of the four substituents is a substituted alkylene($C_1$–$C_3$)phenyl group.

More particularly in such embodiments, in Structure VIII noted above, $Z^+$ is a quaternary ammonium ion in which $R_7$, $R_8$ and $R_9$ are independently linear or branched unsubstituted alkyl groups of 1 to 3 carbon atoms, or linear or branched hydroxyalkyl groups of 1 to 3 carbon atoms that comprise 1 to 3 hydroxy groups as the only substituents (generally only one hydroxy group per carbon atom). More preferably, these radicals are independently methyl, hydroxymethyl, ethyl, 2-hydroxyethyl, 1-hydroxyethyl, or 1,2-dihydroxyethyl and most preferably, they are either methyl or 2-hydroxyethyl.

In this group of preferred Class IV ionomers, $R_{10}$ is a substituted alkylenephenyl group that has at least one substituent on either the alkylene or phenyl moiety of the group. More preferably, the one or more substituents are on the phenyl moiety. The alkylene moiety can be linear or branched in nature and has from 1 to 3 carbon atoms (such as methylene, ethylene, n-propylene or isopropylene). Preferably, the alkylene moiety of $R_{10}$ has 1 or 2 carbon atoms and more preferably, it is methylene. The alkylene moiety can have as many substituents as there are available hydrogen atoms to be removed from a carbon atom. Useful alkylene substituents are the same as those described below in defining the phenyl substituents, but the most preferred substituents for the alkylene moiety are fluoro and alkoxy.

The phenyl moiety of $R_{10}$ can have from 1 to 5 substituents in any useful substitution pattern. Useful substituents include but are not limited to, halo groups (such as fluoro, chloro, bromo, and iodo), substituted or unsubstituted alkyl groups having from 1 to 12 carbon atoms (such as methyl, ethyl, isopropyl, t-butyl, n-pentyl and n-propyl) that can be further substituted with any of the substituents listed herein (such as haloalkyl groups including trihalomethyl groups), substituted or unsubstituted alkoxy groups having 1 to 12 carbon atoms (such as methoxy, ethoxy, isopropoxy, n-pentoxy and n-propoxy), cyano, nitro, substituted or unsubstituted aryl groups having 6 to 14 carbon atoms in the aromatic carbocyclic ring (as defined above for $R_7$, $R_8$ and $R_9$), substituted or unsubstituted alkyleneoxycarbonyl groups having 2 to 12 carbon atoms (such as methyleneoxycarbonyl, ethyleneoxycarbonyl and i-propyleneoxycarbonyl), substituted or unsubstituted alkylcarbonyloxy groups having 2 to 12 carbon atoms (such as methylenecarbonyloxy, ethylenecarbonyloxy and isopropylenecarbonyloxy), substituted or unsubstituted alkylcarbonyl groups having 2 to 12 carbon atoms (such as methylenecarbonyl, ethylenecarbonyl and isopropylenecarbonyl), amido groups, aminocarbonyl groups, trihalomethyl groups, perfluoroalkyl groups, formyl, mercapto and substituted or unsubstituted heterocyclic groups having 5 to 14 atoms in the ring that includes one or more nitrogen, sulfur, oxygen or selenium atoms with the remainder being carbon atoms (such as pyridyl, oxazolyl, thiphenyl, imidazolyl, and piperidinyl).

Preferably, $R_{10}$ contains 1 to 5 substituents (more preferably 1 or 2 substituents) on the phenyl moiety, which substituents are either halo groups, substituted or unsubstituted methyl or ethyl groups, or substituted or unsubstituted methoxy or 2-ethoxy groups. More preferably, $R_{10}$ comprises 1 to 3 methyl, fluoro, chloro, bromo or methoxy groups, or any combination of these groups on either the alkylene or phenyl moiety.

Representative preferred ionomers of Class IV include the following Polymers 28–36:

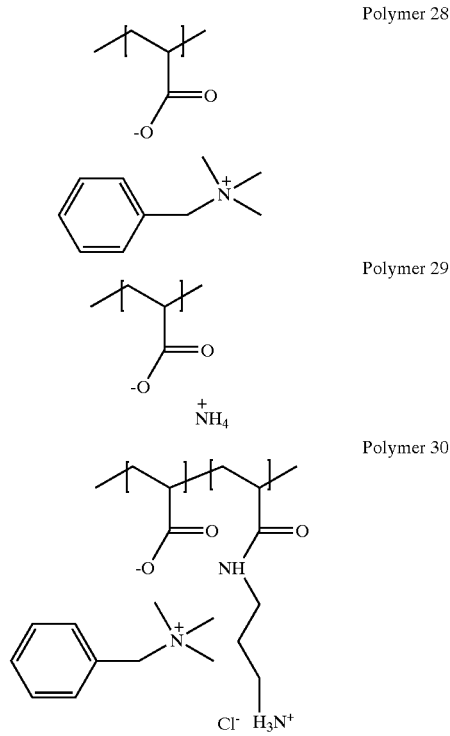

Polymer 28

Polymer 29

Polymer 30

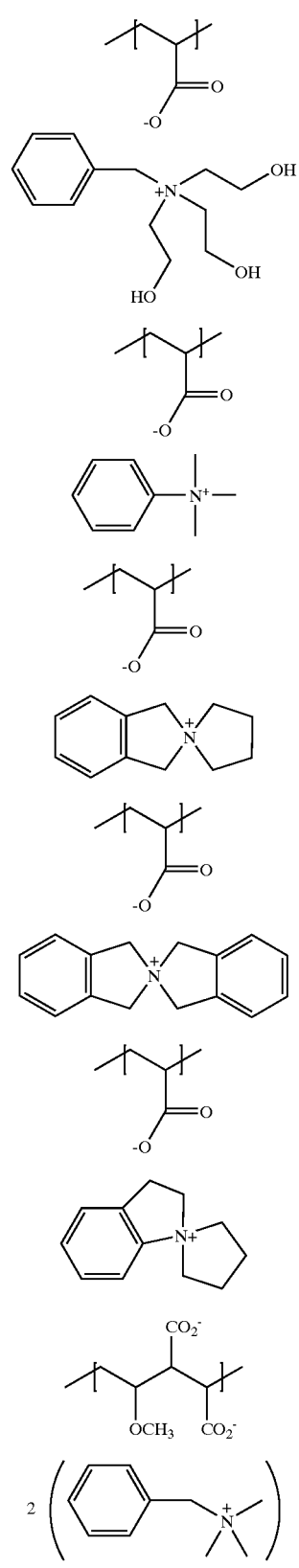
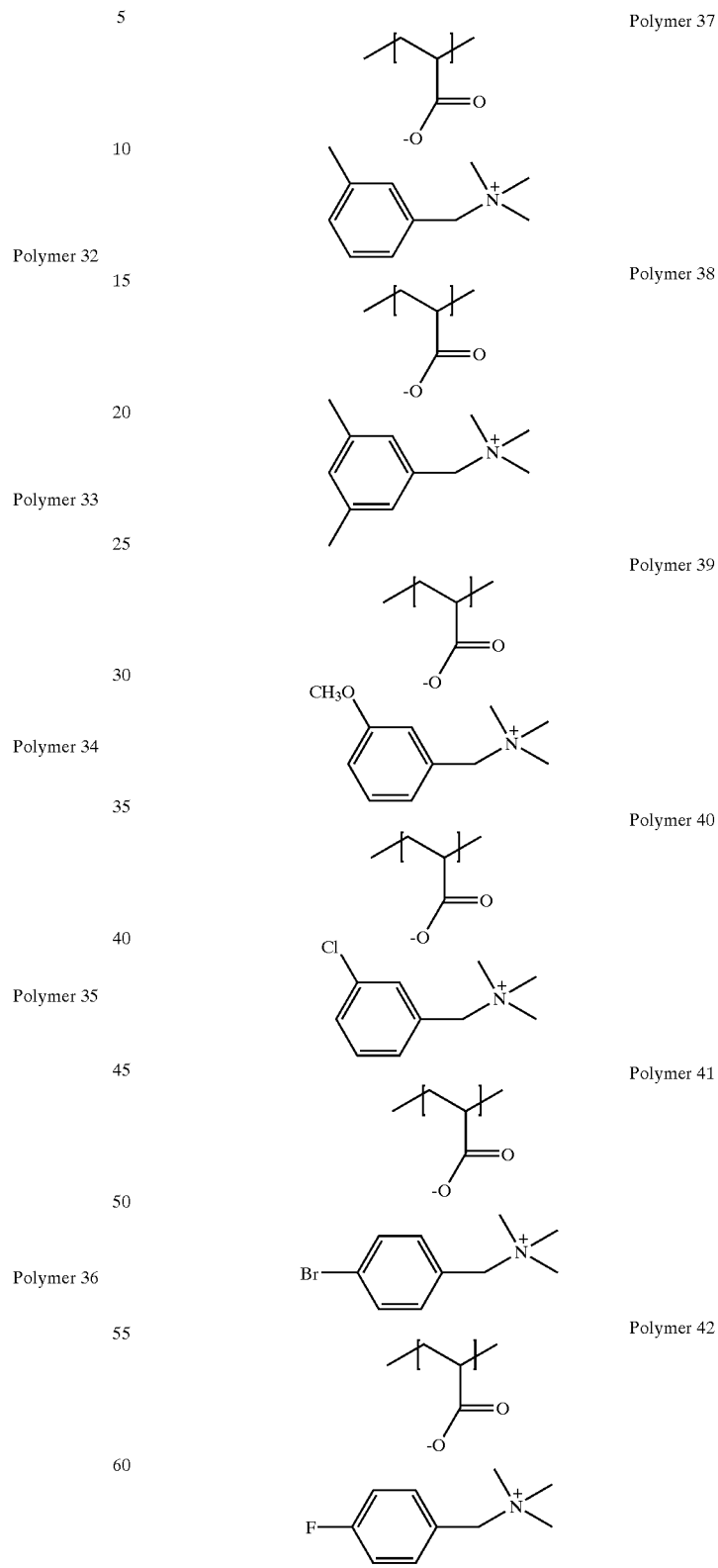
Additional preferred ionomers of Class IV include the following Polymers 37–50 wherein $R_{10}$ includes a substituted alkylenephenyl group:

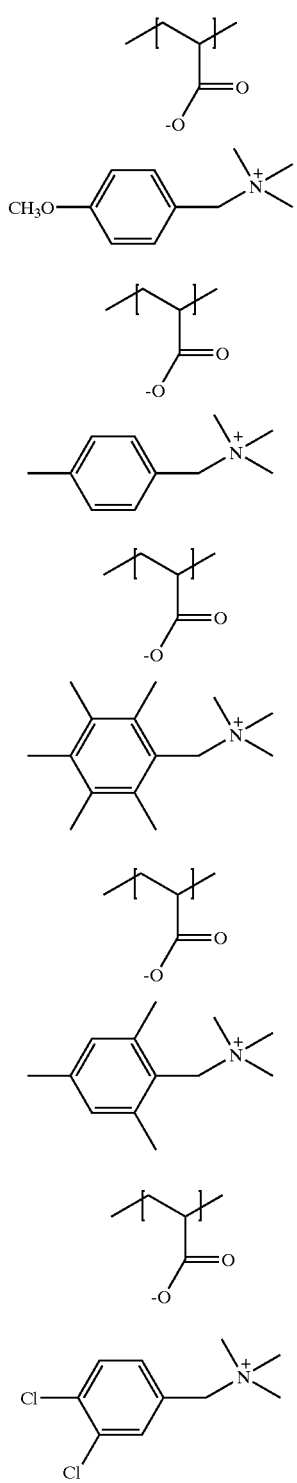

Polymer 43

Polymer 44

Polymer 45

Polymer 46

Polymer 47

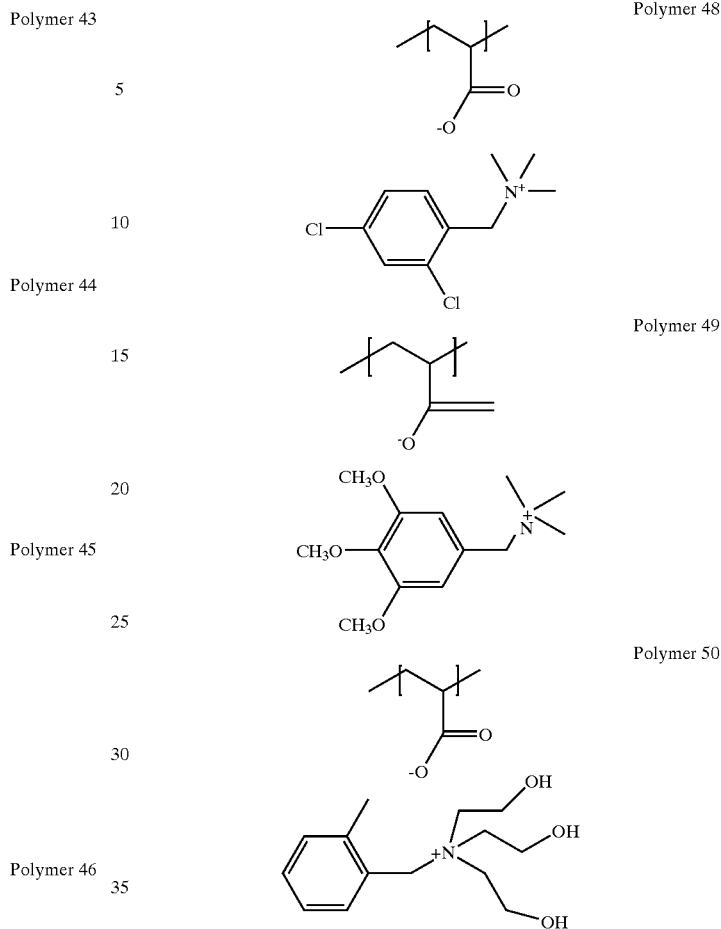

Polymer 48

Polymer 49

Polymer 50

The inkjet ink of the present invention can include one or more Class I, II, III, or IV ionomers with or without minor amounts of additional binder or polymeric materials that will not adversely affect its properties. The heated sensitive ionomers employed in the invention in general is present in the ink jet ink generally from 0.1% to 20% by weight, preferably from 0.5% to 10% by weight. When use as a binder, the weight ratio of the pigment to the polymer is 1:20 to 20:1, preferably 1:5 to 3:1.

The heat-sensitive ionomer can be water soluble or water dispersible. If the heat-sensitive ionomer is water dispersible, the particle size of the dispersion is less than 1 micron, preferably less than 0.5 micron.

The aqueous carrier medium for the ink composition is water or a mixture of water and at least one water miscible co-solvent. Selection of a suitable mixture depends on requirements of the specific application, such as desired surface tension and viscosity, the selected pigment, drying time of the pigmented ink jet ink, and the type of substrater onto which the ink will be printed. Representative examples of water-miscible co-solvents that may be selected include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, tetraethylene glycol, propylene glycol, polyethylene glycol, glycerol, 2-methyl-2,4-pentanediol 1,2,6-hexanetriol and thioglycol; (6) lower alkyl mono- or di-ethers derived from alkylene glycols, such as ethylene glycol mono-methyl (or -ethyl) ether, diethylene glycol mono-methyl (or -ethyl) ether, diethylene glycol mono-butyl (or -ethyl) ether, propylene glycol mono-methyl (or -ethyl) ether, poly(ethylene glycol) butyl ether, triethylene glycol mono-methyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide, 2,2'-thiodiethanol, and tetramethylene sulfone.

The amount of aqueous carrier medium is in the range of approximately 70 to 99 weight %, preferably approximately 90 to 98 weight %, based on the total weight of the ink. A mixture of water and a polyhydric alcohol, such as diethylene glycol, is useful as the aqueous carrier medium. In a preferred embodiment, the inks contain from about 5 to about 80%, more preferably 20–60% by weight of water miscible organic solvent based on the total weight of the aqueous carrier medium.

Jet velocity, separation length of the droplets, drop size and stream stability are greatly affected by the surface tension and the viscosity of the ink. The ink jet inks suitable for use with ink jet printing systems and to apply to non-absorbing substrates, especially high surface energy hydrophobic surfaces, should have a surface tension in the range of about 20 dynes/cm to about 60 dynes/cm and, more preferably, in the range 20 dynes/cm to about 35 dynes/cm. Control of surface tensions in aqueous inks is accomplished by additions of small amounts of surfactants. The level of surfactants to be used can be determined through simple trial and error experiments, usually about 0.1% to about 6%, preferably, 0.5% to about 4% by weight of the total ink composition. Anionic, cationic and nonionic surfactants may be selected from those disclosed in U.S. Pat. Nos. 5,324,349; 4,156,616 and 5,279,654 as well as many other surfactants known in the ink jet ink art. Commercial surfactants include the Surfynols® from Air Products; the Zonyls® from DuPont and the Fluorads® from 3M. Preferred surfactants can be silicon surfactants or fluorinated surfactants. Preferred silicon surfactants are available from BYK-Chemie as BYK surfactants, and from Crompton Corp, as Silwet® surfactants. Commercially available fluorinated surfactants can be the Zonyls® from DuPont and the Fluorads® from 3M, they can be used alone or in combination with other surfactants.

A humectant is added to the composition employed in the process of the invention to help prevent the ink from drying out or crusting in the orifices of the ink jet printhead. Polyhydric alcohols useful in the composition employed in the invention for this purpose include, for example, ethylene glycol, diethylene glycol, triethylene glycol, propylene glycol, tetraethylene glycol, polyethylene glycol, glycerol, 2-methyl-2,4-pentanediol, 1,2,6-hexanetriol and thioglycol. The humectant may be employed in a concentration of from about 10 to about 50% by weight of the entire ink composition. In a preferred embodiment, diethylene glycol or a mixture of glycols is employed a concentration of between 10 and 20% by weight of the entire ink composition.

A penetrant or ink solvent (0–10% by weight) may also be added to the ink composition employed in the process of the invention to help the ink penetrate the receiving substrate, especially when the substrate is a highly non-absorbing. A preferred penetrant for the inks employed in the present invention is n-propanol at a final concentration of 1–6% by weight. The type of humectant or ink solvent was chosen based on the evaporation rate and the effectiveness of interaction with the substrate such as untreated vinyl. The preferred humectants are polyhydric alcohols that has an boiling point of 200° C. or less, more preferably 150° C. or less.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of the nozzle.

A penetrant (0–10% by weight) may also be added to the ink composition employed in the process of the invention to help the ink penetrate the receiving substrate, especially when the substrate is a highly sized paper. A preferred penetrant for the inks employed in the present invention is n-propanol at a final concentration of 1–6% by weight.

A biocide (0.01–1.0% by weight) may also be added to prevent unwanted microbial growth which may occur in the ink over time. A preferred biocide for the inks employed in the present invention is Proxel® GXL (Zeneca Colours Co.) at a concentration of 0.05–0.5% by weight. Additional additives which may optionally be present in ink jet inks include thickeners, conductivity enhancing agents, antikogation agents, pH buffering agents, drying agents, and defoamers.

Ink jet inks made using polymers employed in this invention are employed in ink jet printing wherein liquid ink drops are applied in a controlled fashion to an ink receiving substrate, by ejecting ink droplets from plurality of nozzles, or orifices, in a print head of ink jet printers.

Commercially available ink jet printers use several different methods to control the deposition of the ink droplets. Such methods are generally of two types: continuous stream and drop-on-demand.

In drop-on-demand systems, a droplet of ink is ejected from an orifice directly to a position on the ink receiving layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

To accelerate the printing speed and increase durability, an in-situ heating step during printing and a post heating step are preferred. Heating will allow fluid not only to spread on the non-absorbing substrate but also to evaporate faster, and help the ink component interaction with the non-absorbing substrate by swelling or penetrating mechanism. The in-situ heating step can be achieved using a heating means such that the non-absorbing substrate is heated to elevated temperature during the printing. The temperature range of substrate is preferably between 30° C. and 90° C., more preferably between 40 and 70° C. A post-heating step after printing is further preferred. During the post heating, the printed substrate is heated to elevated temperature using a heating means where the temperature range of the substrate is preferably between 50° C. and 150° C., more preferably between 80 and 120° C. Various methods may be used for the means of heating, for example, light irradiation, a hot air source or an electrical heater. For in-situ heating, the electrical heater is preferred. For post-heating, light irradiation such as using an infrared lamp is preferred. Optionally, an infrared absorbing material can be employed in the ink of the present invention to assist the heating by infrared lamp.

The following examples illustrate the utility of the present invention.

EXAMPLES

Preparation of Polymer Dispersions
Preparation of Comparative Polymer Dispersion 1 (PC-1: Acrylate Non-Heat Sensitive)

600 g of deionized water and 3.6 g Triton 770® surfactant were charged to a 1-liter, three-neck round-bottom flask equipped with a mechanical stirrer and nitrogen inlet. The solution was purged with nitrogen for 30 min and heated to 60° C. in a constant temperature bath. 36.0 g of styrene, 90.0 g of butyl methacrylate and 54.0 g of methacrylic acid were added and stirred for three minutes. 16.4 g of 10% sodium persulfate solution and 5.5 g of 10% sodium metabisulfite solution were added to initiate the polymerization. Polymerization was continued for one hour and heated one more hour at 60° C. The temperature was reduced to 50° C. and 1 ml each of t-butyl hydroperoxide (10%) and sodium formaldehyde bisulfite (10%) were post-added. The content of the hydrophilic monomer is 30% by weight of the total polymer. The latex was cooled and filtered. The dispersion contains 22.2% solid by weight.

Preparation of Comparative Polymer Dispersion 2 (PC-2: Water Soluble Acrylate, Non-Heat Sensitive)

Commercially available alkaline soluble resin Trudot IJ-4655® is obtained from Westvaco as a 100% net solid. 25.0 g of Trudot IJ-4655 was mixed with 5.8 g of KOH and 69.2 g distilled water. The mixture was stirred at room temperature for 48 hours. The resulted solution was filtered through a 3 micron filter. The final solution contains 25.0% solids.

Preparation of Comparative Polymer Dispersion 3 (PC-3: Hydrophobic Polymer, Non-Heat Sensitive)

160 g deionized water were charged to a 500 mL 1-neck round bottom flask equipped with mechanical stirrer. The flask was first flushed with nitrogen for 20 minutes, then immersed in a constant temperature bath at 40° C. Afterwards, 0.25 g of potassium persulfate, 0.35 g sodium metabisufite, 2.0 g Triton 770 (30% active), 4.0 g of ethyl acrylate, 36.0 g vinylidene chloride were added to the flask. The polymerization reaction was continued for additional 12 hours. The latex was cooled and filtered. The final polymer latex dispersion contained 13.52% solid by weight and the average particle size is 0.056 micron. This polymer contains no hydrophilic monomer. This polymer dispersion is designated as Comparative Polymer Dispersion 3 (PC-3).

Preparation of Heat-Sensitive Ionomer 1 of the Invention P-1 (Class III, Thiosulfate Ionomer)

A five-liter three-neck flask was equipped with a mechanical stirrer, an argon bleed and a condenser. The vessel was placed in a heating apparatus and the stirrer set to 100 rpm. With stirring, 120 mL of demineralized water was added to the vessel, followed by 118.6 g (0.75 mol) of sodium thiosulfate. The sodium thiosulfate was stirred until completely dissolved at room temperature. To this clear solution was added 111.4 g (0.73 mol) chloromethylstyrene (a mixture of 3- and 4-chloromethylstyrene), followed by 360 g of methanol. The mixture was heated to a gentle reflux temperature of around 70 C., under a slight argon flow, and stirred at this temperature for 3 hours. The solution was allowed to cool slowly to room temperature and 1720 g of methanol was added, followed by 365 g (3.65 mol) of methyl methacrylate. The solution was heated to 60 C., and 2.5 g (0.45 wt % of monomers) 2,2'-azobis(2-methylpropanenitrile) (Vazo 64) was added. The solution was heated to a gentle reflux at around 70 C., under positive argon pressure, and stirred for 24 hours. The polymer product was cooled to room temperature, filtered through course cloth, and ultrafiltered to remove residual small molecules. The final aqueous product was hazy, 3260 g at 13.8% solid, 82% yield. Molecular weight average by SEC= 149,000.

Preparation of Heat Sensitive Ionomer 2 of the Invention P-2: (Class IV, Ammonium Salt Ionomer)

Commercially available alkaline soluble resin Trudot IJ-4655® is obtained from Westvaco as a 100% net solid. 25.0 g of Trudot IJ-4655 was mixed with 6.07 g ammonium hydroxide solution (29% active) and 68.9 g distilled water. The mixture was stirred at room temperature for 48 hours. The resulted clear solution was filtered through a 3 micron filter. The final solution contains 26.28% solids.

Preparation of Pigment Dispersion

The magenta pigment dispersion contains: 300 g of Polymeric beads, mean diameter of 50 µm (milling media); 30 g of quinacridone magenta pigment Pigment Red 122 (Sun Chemicals); 9 g of Oleoyl methyl taurine, (OMT) Potassium salt and 208 g of Deionized water, and 0.2 g of Proxel GXL® (biocide from Zeneca). The above components were milled in a 2 liter double walled vessel obtained from BYK-Gardner using a high energy media mill manufactured by Morehouse-Cowles Hochmeyer. The mill was run for approximately 8 hours at room temperature. The dispersion was separated from the milling media by filtering the millgrind through a 4–8 µm KIMAX® Buchner Funnel obtained from VWR Scientific Products. At the end of milling, additional water is added to the dispersion so that the pigment is about 10.0% by weight of the total final dispersion and the biocide is about 230 ppm by weight of the total final dispersion. The particle size is about 30 nm as measured by MICROTRAC II Ultrafine particle analyzer (UPA) manufactured by Leeds & Northrup.

Ink Formulation
Ink 1 of the Invention (I-1) (P-1 as a Binder)

To prepare the Ink-1, 4.36 g of the Magenta Pigment Dispersion (10% active), 0.2 g Silwet® L-7608 (Crompton Corp.), 2.0 g triethylene glycol and 1.0 g di(propyleneglycol) methyl ether (Dowanol® DPM), 0.6 g 2-pyrrolidone, and 2.84 g of Polymer Dispersion P-1 (13.80% active) were added together with distilled water so that the final weight of the ink was 20.0 g. The final ink contained 2.18% Pigment Red 122, 1.0% Silwet® L-7608, 10.0% diethylene glycol, 5% di(propyleneglycol) methyl ether, 3% 2-pyrrolidone and 1.96% Polymer Dispersion P-1. The solution was filtered through a 3 µm polytetrafluoroethylene filter.

Ink 2 of the Invention (I-2) (P-2 as a Binder)

Ink-2 of the present invention was prepared similar to Ink-1 except that 1.49 g of Polymer Dispersion P-2 (26.28% active) was used instead of Polymer Dispersion 2 such that the final ink contained 1.96% of Polymer Dispersion P-2 by weight of the total ink.

Comparative Ink 1 (C-1: Acrylic Latex, Non-Heat Sensitive)

The comparative ink 1 was prepared similar to Ink-1 of the Invention except that 1.76 g of Comparative Polymer Dispersion PC-1 (22.2% active) was used instead of Polymer Dispersion 1. The final Ink contained 1.96% of Comparative Polymer Dispersion PC-1.

Comparative Ink 2 (C-2: Water Soluble Polymer, Non-Heat Sensitive)

The comparative ink 2 was prepared similar to Comparative Ink 1 except that 1.57 g of Comparative Polymer Dispersion PC-2 (25% active) was used instead of Polymer Dispersion 1. The final Ink contained 1.96% of Comparative Polymer Dispersion PC-2.

Comparative Ink 3 (C-3: Hydrophobic Polymer, Non-Heat Sensitive)

The comparative ink 2 was prepared similar to Comparative Ink 1 except that 2.96 g of Comparative Polymer Dispersion PC-3 (13.25% active) was used instead of Polymer Dispersion 1. The final Ink contained 1.96% of Comparative Polymer Dispersion PC-3.

Ink Firability Test

The Inks of present invention were filled into Epson 880 empty cartridges and printing was done with an Epson 880 Ink jet printer, using the above inks. All inks of the invention fired well through the Epson 880 printer, no nozzles were clogged. The inks were left in printer for over 48 hours and the above printing test was repeated. The inks are rated as following:

A: All the nozzles were firing with minimum cleaning cycles without any problems for the inks of the present invention.

B: Some nozzles were missing after at least three cleaning cycles.

C: A lot of nozzles were missing after extensive cleaning (>3 cleaning cycles)

D: Didn't fire at all.

The tested results are listed in Table 1

Durability Test

Test Sample Preparation

A non-absorbing vinyl substrate, a multi-purpose inkjet cast vinyl (MPI 1005 #226 from Avery Graphics) was cut into 14 by 25 cm in size and placed on a heated coating block with temperature at about 40° C. The above inks were filled into an airbrush (Paasche Sirbrush Set H-3 available from Paasche Airbrush Company, Harwood Heights, Ill.) connected to compressed house air. The pressure of the airbrush was adjusted to about 7.46 Kg such that smooth ink flow was obtained. The inks were sprayed onto the heated vinyl substrates described above. Uniform coatings of the inks were obtained. The selected samples were then heated at 90° C. for 1 minute using an infrared lamp.

Dry Rub Resistance Test

The dry rub resistance test was carried out by rubbing the samples with a dry Q-tip for 4 passes under a consistent pressure in the inked area. The color loss in the treated sample area and the color transfer to Q-tip were examined visually and a rating of the dry rub resistance was given as follows on a scale of 0 to 5.

0: Best. No color loss, and/or color transfer;
1: hardly visible amount of color loss and/or color transfer;
2: visible amount of color loss and/or color transfer;
3: some color loss and color transfer;
4: large amount of color loss and color transfer;
5: Worst. Almost complete color loss and color transfer.

Wet Rub Resistance Test

A wet rub resistance test was carried out by placing an approximately 2.54 cm diameter water droplet on the ink-coated sample surface for 5 minutes, after which the excess water was wiped off with a paper towel. The above treated area was then rubbed with a dry paper towel for 4 passes under a consistent pressure a 3.5 cm diameter area. The color loss in the treated sample area and the color transfer to the paper towel were examined visually and a rating of the wet rub resistance was given similar as above on a scale of 0 to 5, 0 being the best and 5 being the worst. Both of the dry and wet rub resistance test results are shown in Table 1.

TABLE 1

| Ink | Polymer Binder | Firability Rating | Dry Rub Rating | Wet Rub Rating |
|-----|----------------|-------------------|----------------|----------------|
| C-1 | PC-1 | B | 2 | 4 |
| C-2 | PC-2 | A | 1 | 4 |
| C-3 | PC-3 | C | 0 | 1 |
| I-1 | P-1 | A | 0 | 1 |
| I-2 | P-2 | A | 1 | 1 |

From the above table, it is evident that the presence of heat sensitive ionomer in the ink significantly improves both the ink firability as well as image durability in comparison with the comparative inks.

What is claimed is:

1. An aqueous inkjet ink composition comprising:
    a pigment;
    a water soluble heat-sensitive ionomer,
    at least one surfactant;
    a humectant;
    wherein the ionomer is a charged polymer having at least 15 mole % of the recurring units negatively or positively charged.

2. The composition of claim 1 wherein the heat-sensitive ionomer is selected from the following four classes of polymers:
    I) a crosslinked or uncrosslinked vinyl polymer having recurring units comprising positively-charged, pendant N-alkylated aromatic heterocyclic groups;
    II) a crosslinked or uncrosslinked polymer having recurring organoonium groups;
    III) a polymer comprising a pendant thiosulfate group; and
    IV) a polymer comprising recurring units having carboxy or carboxylate groups.

3. The composition of claim 2 wherein said heat-sensitive ionomer falls within Class I polymer and is represented by the Structure I:

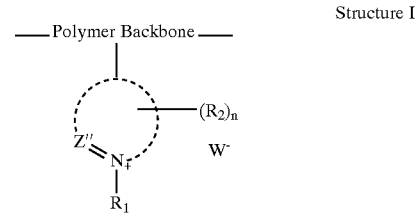

Structure I wherein $R_1$ is an alkyl group, $R_2$ is an alkyl group, an alkoxy group, an aryl group, an alkenyl group, halo, a cycloalkyl group, or a heterocyclic group having 5 to 8 atoms in the ring, $Z''$ represents the carbon and nitrogen, oxygen, or sulfur atoms necessary to complete an aromatic N-heterocyclic ring having 5 to 10 heteroatoms in the ring, n is 0 to 6, and $W^-$ is an anion.

4. The composition of claim 3 wherein $R_1$ is an alkyl group of 1 to 6 carbon atoms, $R_2$ is a methyl, ethyl or n-propyl group, $Z''$ represents the carbon, nitrogen, oxygen, and sulfur atoms to complete a 5-membered ring, and n is 0 or 1.

5. The composition of claim 2 wherein said heat-sensitive ionomer falls under Class II polymer in claim 2 and is a polyester, polyamide, polyamide-ester, polyarylene oxide or a derivative thereof, polyurethane, polyxylylene or a derivative thereof, a poly(phenylene sulfide) ionomer, or a silicon-based sol gel.

6. The composition of claim 2 wherein said ionomer falls under Class II polymer and comprises an organoonium moiety that is a pendant quaternary ammonium group on the backbone of said Class II polymer.

7. The composition of claim 2 wherein said heat-sensitive ionomer falls under Class II vinyl polymer represented by either of Structures III, IV or V:

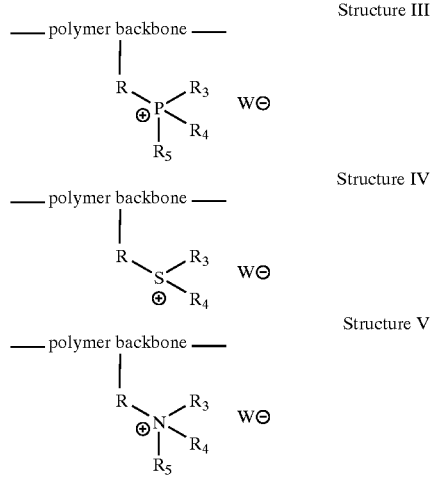

wherein R is an alkylene, arylene, or cycloalkylene group or a combination of two or more such groups, $R_3$, $R_4$ and $R_5$ are independently substituted or unsubstituted alkyl, aryl or cycloalkyl groups, or any two of $R_3$, $R_4$ and $R_5$ can be combined to form a heterocyclic ring with the charged phosphorus, nitrogen or sulfur atom, and $W^-$ is an anion.

8. The composition of claim 7 wherein R is an ethyleneoxycarbonyl or phenylenemethylene group, and $R_3$, $R_4$ and $R_5$ are independently a methyl or ethyl group, and $W^-$ is a halide or carboxylate.

9. The composition of claim 8 wherein x' is from about 20 to about 98 mol %, y' is from about 2 to about 10 mol % and z' is from 0 to about 73 mol %.

10. The composition of claim 7 represented by the structure VI:

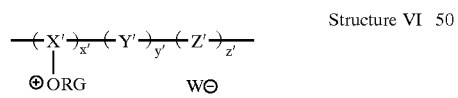

wherein ORG represents organoonium groups, X' represents recurring units to which the ORG groups are attached, Y' represents recurring units derived from ethylenically unsaturated polymerizable monomers that may provide active sites for crosslinking, Z' represents recurring units derived from any additional ethylenically unsaturated polymerizable monomers, w+ is an anion, x' is from about 15 to about 99 mol %, y' is from about 1 to about 20 mol %, and z' is from 0 to about 84 mol %.

11. The composition of claim 2 wherein said heat-sensitive ionomer falls under Class IV polymer and comprises at least 1 mole of carboxy or carboxylate groups per 1300 g of polymer.

12. The composition of claim 11 wherein said heat-sensitive ionomer is represented by Structure VIII below wherein "$A_1$" represents recurring units derived from ethylenically unsaturated polymerizable monomers, $X_1$ is a divalent linking group, $Z^+$ a monovalent cation, and $B_1$ represents non-carboxylated recurring units, p is 0 or 1, $m_1$ is 0 to about 95 mol %, and $n_1$ is from about 5 to 100 mol %.

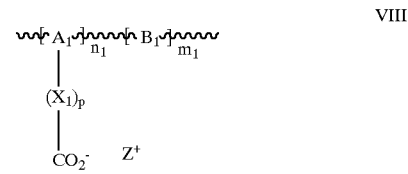

13. The composition of claim 1 wherein said heat-sensitive ionomer falls under Class I polymer in claim 2 and it is represented by the Structure II:

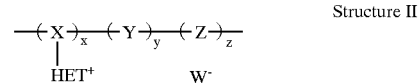

wherein $HET^+$ represents a positively-charged, pendant N-alkylated aromatic heterocyclic group, X represents recurring units having attached $HET^+$ groups, Y represents recurring units derived from ethylenically unsaturated polymerizable monomers that provide active crosslinking sites, Z represents recurring units for additional ethylenically unsaturated monomers, x is from about 15 to 100 mol %, y is from 0 to about 20 mol %, z is from 0 to about 85 mol %, and $W^-$ is an anion.

14. The composition of claim 13 wherein said positively-charged, pendant N-alkylated aromatic heterocyclic group is an imidazolium or pyridinium group.

15. The composition of claim 1 wherein said heat-sensitive ionomer falls under Class III polymer in claim 2 and is a polymer having the Structure VII:

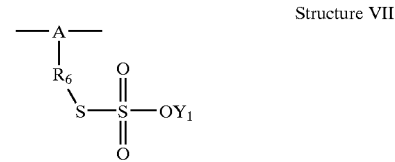

wherein A represents a polymeric backbone, $R_6$ is a divalent linking group, and $Y_1$ is a hydrogen or a cation.

16. The composition of claim 15 wherein $R_6$ is an alkylene group, an arylene group, an arylenealkylene group, or $—(COO)_{n'}(Z_1)_m$ wherein n' is 0 or 1, and $Z_1$ is an alkylene group, an arylene group, or an arylenealkylene group, and $Y_1$ is hydrogen, ammonium ion or a metal ion.

17. The composition of claim 16 wherein $R_6$ is an alkylene group of 1 to 3 carbon atoms, an arylene of 6 carbon atoms in the aromatic ring, an arylenealkylene of 7 or 8 carbon atoms in the chain, or $—COOZ_1$ wherein $Z_1$ is methylene, ethylene or phenylene, and $Y_1$ is hydrogen, ammonium, sodium, or potassium.

18. The composition of claim 1 wherein said heat-sensitive ionomer has a mean particle size of less than 1 micron.

19. The composition of claim 1 wherein said heat-sensitive ionomer has a mean particle size of less than 0.5 micron.

20. The composition of claim 1 wherein the weight ratio of the pigment to the polymer is 1:20 to 20:1.

21. The composition of claim 1 wherein the weight ratio of the colorant to the polymer is 1:5 to 3:1.

22. The ink composition of claim 1 wherein the pigment particles comprise up to 10% by weight of the ink composition.

23. The ink composition of claim 1 wherein the said surfactant is a siliconated or a fluorinated surfactant or a mixture of both.

24. The composition of claim 1 wherein the said pigment is a self-dispersing pigment, an encapsulated pigment or a pigment dispersed by a dispersant.

25. An aqueous inkjet ink and receiver combination wherein said aqueous ink jet ink comprises:

a pigment;

a heat sensitive ionomer;

at least one surfactant;

a humectant; and said receiver comprises a non-absorbing substrate.

26. The combination of claim 25 wherein the non-absorbing substrate is a plastic, glass, ceramic or metal substrate.

27. The combination of claim 28 wherein said plastic substrate is an untreated vinyl.

* * * * *